United States Patent
Strode et al.

(10) Patent No.: US 9,626,239 B2
(45) Date of Patent: Apr. 18, 2017

(54) BUG REPORTING AND COMMUNICATION

(71) Applicant: Red Hat, Inc., Raleigh, NC (US)

(72) Inventors: Maureen Emily Strode, Cambridge, MA (US); Ryan John Lerch, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 117 days.

(21) Appl. No.: 14/147,632

(22) Filed: Jan. 6, 2014

(65) Prior Publication Data

US 2015/0193329 A1     Jul. 9, 2015

(51) Int. Cl.
G06F 9/44 (2006.01)
G06F 11/07 (2006.01)
G06F 11/36 (2006.01)

(52) U.S. Cl.
CPC ...... *G06F 11/0709* (2013.01); *G06F 11/0769* (2013.01); *G06F 11/0784* (2013.01); *G06F 11/3664* (2013.01)

(58) Field of Classification Search
None
See application file for complete search history.

(56) References Cited

U.S. PATENT DOCUMENTS

| | | | | |
|---|---|---|---|---|
| 5,874,953 A * | 2/1999 | Webster et al. | | 715/733 |
| 6,205,579 B1 * | 3/2001 | Southgate | | 717/173 |
| 6,536,037 B1 * | 3/2003 | Guheen et al. | | 717/151 |
| 7,149,928 B2 | 12/2006 | van Os | | |
| 7,552,365 B1 * | 6/2009 | Marsh et al. | | 714/47.2 |
| 8,321,837 B2 * | 11/2012 | Broberg et al. | | 717/124 |
| 8,381,189 B2 * | 2/2013 | Surazski et al. | | 717/125 |
| 8,429,516 B1 * | 4/2013 | Riggs et al. | | 715/201 |
| 8,548,967 B1 | 10/2013 | Poole | | |
| 8,713,531 B1 * | 4/2014 | Pettis et al. | | 717/124 |
| 2006/0031304 A1 * | 2/2006 | Bagga et al. | | 709/206 |
| 2007/0006041 A1 * | 1/2007 | Brunswig et al. | | 714/38 |
| 2007/0143165 A1 * | 6/2007 | Roberts et al. | | 705/8 |
| 2009/0293043 A1 * | 11/2009 | Begel et al. | | 717/122 |
| 2012/0272207 A1 | 10/2012 | Lerner et al. | | |

(Continued)

FOREIGN PATENT DOCUMENTS

EP     1898577 A1     3/2008

OTHER PUBLICATIONS

"Report Bugs" <http://source.android.com/source/report-bugs.html> as archived by the WaybackMachine <https://archive.org> on Jan. 22, 2013.*

(Continued)

*Primary Examiner* — Jason Mitchell
(74) *Attorney, Agent, or Firm* — Haynes and Boone, LLP

(57) ABSTRACT

A method for software bug resolution includes generating, with a software bug reporting client module, a software bug report for a bug, the bug being detected in a piece of software. The method further includes prompting a user to add information about the bug to the software bug report and sending the software bug report to a bug reporting entity to be presented as a post on a feed, the feed associated with the bug reporting entity. The method further includes receiving, from the bug reporting entity, a notification of a response to the post, and pushing, through the software bug reporting client module, the notification to the user.

20 Claims, 6 Drawing Sheets

(56) References Cited

U.S. PATENT DOCUMENTS

2013/0014084 A1* 1/2013 Sahibzada et al. ........... 717/124
2013/0219217 A1* 8/2013 Seren et al. .................... 714/27

OTHER PUBLICATIONS

"Life of a Bug" <http://source.android.com/source/life-of-a-bug.html> as archived by the WaybackMachine <https://archive.org> on Jan. 22, 2013.*
Goetz "iTunes 101: Multiple Devices, on iTunes Account", 2011, <https://gigaom.com/2011/03/30/itunes-101-multiple-devices-one-itunes-account/> downloaded on Jul. 14, 2016.*
"Web Application Bug Reporting Using BugDigger", http://www.youtube.com/watch?v=K1CgbTttho8, Oct. 20, 2010, 2 pages.
Dane Bertram, Thesis for "The Social Nature of Issue Tracking in Software Engineering" http://grouplab.cpsc.ucalgary.ca/grouplab/uploads/Publications/Publications/2009-Bertram.MScThesis.pdf, University of Calgary, Dec. 2009, 144 pages.
"Comindware Tracker" http://www.comindware.com/tracker/, Copyright 2009, 8 pages.
Irina Brake et al., "Who Learns from whom? Supporting Users and Developers of a Major Biodiversity e-Infrastructure" http://www.ncbi.nlm.nih.gov/pmc/articles/PMC3234438/, Nov. 28, 2011, 10 pages.
"Simple Task Management" http://bugkick.com/, Copyright 2013, 8 pages.

* cited by examiner

BUG REPORTING AND COMMUNICATION

BACKGROUND

The present disclosure relates generally to software bug reporting, and more particularly to bug reporting communication systems.

A software bug is an unintended error, flaw, or fault in a set of computer readable instructions that causes the system to perform in an unintended manner or produce an unexpected result. Software bugs are present due to the complex nature of computing systems. Specifically, due to the varieties of hardware and different programs running on a system, bugs are known to occur.

Developers, wishing to fix the bugs in the software they produce, often provide a mechanism for users to report bugs. In some cases, this can be done automatically if the bug causes the program to crash or freeze. Specifically, information about the state of the program before the crash may be packaged into a bug report.

In some cases, a mechanism is available to report a bug manually. This process, however, can be a hassle. A user typically has to determine where to report the bug, sign in to the bug reporting system with a username and password, and write a description of the bug. This hassle often deters users from reporting the bug.

Moreover, when the developer receives such reports, more information is often needed for the developer to better determine how to fix the bug. But, the user who reported the bug may be difficult to contact or be unresponsive to any attempts at contact. Thus, the bug report is closed because the developer cannot proceed without more information.

Accordingly, it would be desirable to provide improved systems and methods for bug reporting and communication.

SUMMARY

According to certain illustrative examples, a method for software bug resolution, the method performed by a processing system, includes generating, with a software bug reporting client module, a software bug report for a bug in a piece of software. The method further includes prompting a user to add information to the software bug report and sending the software bug report to a bug reporting entity. The method further includes receiving, from the bug reporting entity, a notification of a response to the post, the post corresponding to the bug report, and presenting, through the software bug reporting client module, the notification to the user.

A server system includes a processor and a memory comprising computer readable instructions that, when executed by the processor, cause the processor to receive a bug report from a client module running on a client system, the client system being in communication with the server over a network, the bug report including user-added information about a bug in a piece of software, publish the bug report as a post in a news feed, the news feed being available to at least persons who have an account with a bug reporting entity, the bug reporting entity being associated with the server, and send a response to the post to the client module, the response to be pushed to a user of the client system.

According to certain illustrative examples, a non-transitory, machine-readable medium comprising a set of machine readable instructions that when executed by a processor, cause the processor to generate, with a software bug reporting client module, a software bug report in response to detection of a bug in a piece of software, prompt a user to add information about the bug to the software bug report, send the software bug report to a bug reporting entity, receive, from the bug reporting entity, a notification of a response to a post within a feed, the post corresponding to the bug report, the feed corresponding to the bug reporting entity, the response being from a developer of the piece of software, present, through the software bug reporting client module, the notification to the user, and implement a fix provided by the developer, the fix being accessible through the response.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is often a hassle for a user to figure out how to report a bug. In some cases, a user may be unfamiliar with his or her computing system and not have the ability to describe what other processes were running and any other information that may be helpful to a developer. Additionally, it may be hard for a developer who receives a bug report to get additional information from the user.

According to various examples of principles described herein, a user may be provided with a bug reporting client module. The client module is an application that runs on the user's computing system. In one example, the client module prompts the user for information about a bug in response to a program crashing. In some examples, the user manually initiates the bug reporting client module. In either case, the bug report is packaged with the user's description and posted to a bug reporting feed.

The bug reporting feed may be presented in a manner similar to various social media sites. Specifically, the newest posts are at the top while the older posts are pushed down on the list. The bug reporting feed may be provided by a developer or another entity that wishes to facilitate software bug resolution. The bug reporting feed may be publicly available. In some examples, the feed may be available to only developers and users who have an account with the entity that provides the feed.

The feed provides a mechanism for better bug resolution and communication. Specifically, other users or developers may respond to posts on the feed. When someone responds to a user's post, the client module on the user's computer may push the notification to the user. Thus, the user may be more likely to respond to requests for additional information from the developer.

Figure 1:
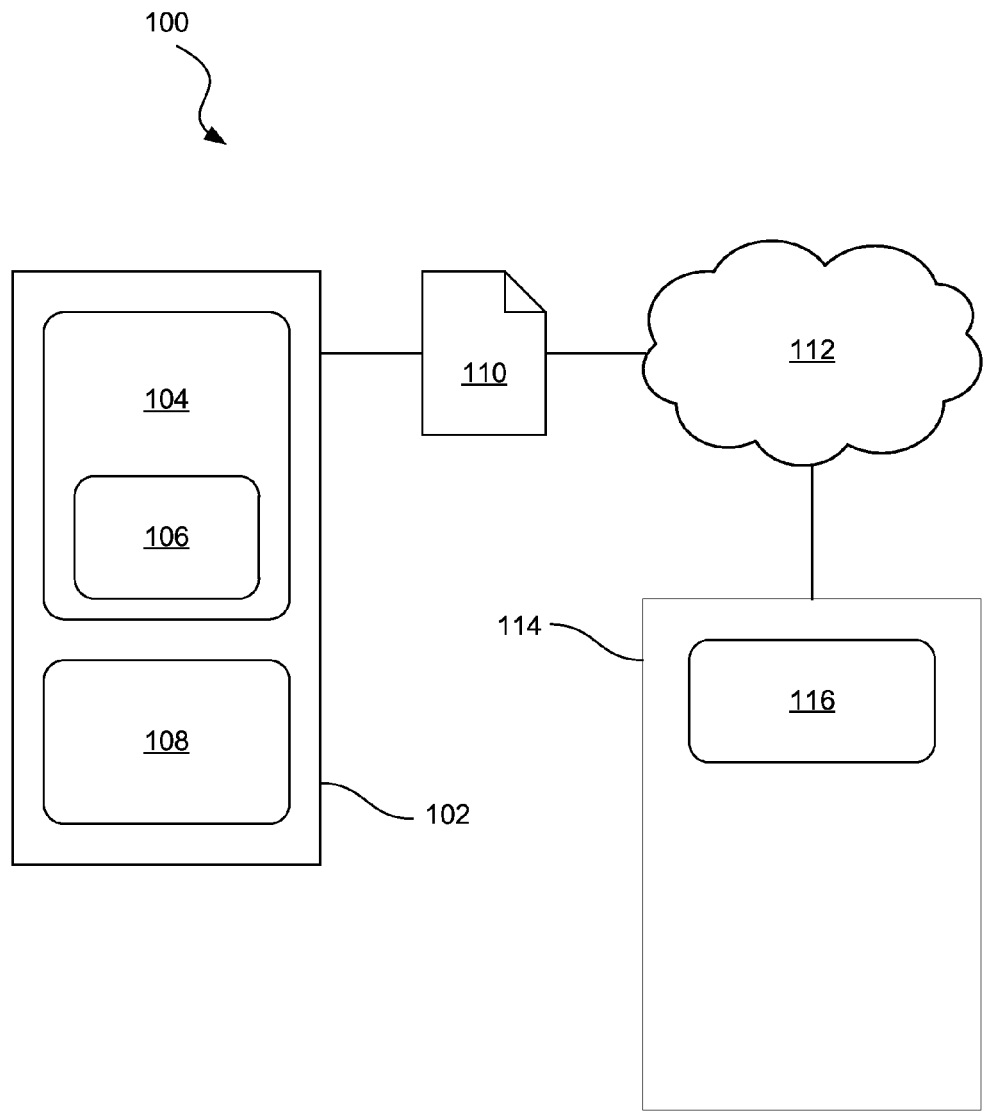
FIG. 1 is a diagram showing an illustrative client/server system that can be used for a bug reporting and communication tool, according to one example of principles described herein.

FIG. 1 is a diagram showing an illustrative client/server system that can be used for a bug reporting and communication tool. According to certain illustrative examples, the system 100 includes a client system 102 that runs a piece of software 104. The client system 102 also runs a bug reporting client module 108. The client module 108 sends a bug report 110 to a server 114 over a network 112. The server 114 then provides the bug report as a post on a feed 116.

The client system 102 may be any type of computing system. For example, the client system 102 may be a desktop computing system. In some examples, the client system 102 may be a laptop computing system. The client system 102 includes the various pieces of hardware and software to provide the user with a system that can run various applications.

In this example, the client system 102 runs a piece of software 104 that has a bug 106. Software refers to a set of machine readable instructions. The piece of software 104 may be any type of application running on the client system 102. In one example, the piece of software 104 may be the operating system itself. In some examples, the piece of software 104 may be an application that is run by the operating system. For example, the piece of software 104 may be a word processing application, a web browsing application, a photo-editing application, or any other type of application that may run on a computing system.

As described above, software often includes various bugs. The bug 106 in the piece of software 104 may be any type of bug 106. In one example, the bug 106 may cause the piece of software 104 to freeze or crash under certain conditions. In some examples, the bug 106 may cause an unexpected or undesired result without causing the piece of software 104 to freeze or crash.

The bug reporting and communication client module 108, which will simply be referred to as the client module 108, is an application that runs on the client system 102. In one example, the client module 108 is part of the operating system of the client system 102. In one example, the client module 108 is a separate application that is run by the operating system. The client module 108 may be configured to run in the background and detect whether a piece of software 104 crashes or freezes. The client module 108 may be designed to be opened upon startup. Additionally, a tool to access the client module 108 may be readily available to a user. In some examples, the client module 108 may include a widget with which the user may interact. The client module 108 may be produced or provided by the bug reporting entity.

In some examples, the client module 108 may include a mobile application component that runs on the user's mobile device. For example, it may be the case that the bug 106 not only causes the piece of software 104 to crash, but also causes the entire client system 102 to freeze or crash. In such case, the user may not have the ability to use the client module 108 on the client system 102 to report the bug 106. But, the user may report the bug through the mobile application on the user's mobile device. Additionally, the user may take pictures with the mobile device, if the mobile device is equipped with a camera. The picture may be of the graphical user interface of the client system in a frozen state. Alternatively, the picture may be of the graphical user interface performing an undesired function. Such an image may be helpful for a developer to determine the cause of the bug.

The client module 108 may be designed to prompt a user to send a bug report 110 in response to detecting the bug 106. Alternatively, the user may initiate the bug report 110. For example, if the piece of software 106 is exhibiting an undesired or unexpected result, but has not crashed, the user may manually initiate the bug report 110.

The bug report 110 may include various types of information about the bug 106. Specifically, the bug report 110 may include information that is automatically gathered by the client module 108. This may include information that is not readily available to a user. Such information may include the processor state at the time the bug 106 was presented, the processes and applications that were also being run by the client system 102, the state of the memory of the client system 102, and any other information which may be helpful to a developer.

The bug report 110 may also include information that is provided by the user. The user may be prompted to type in information about the bug 106. The user may be asked to describe what he or she was doing before the bug 106 occurred. For example, the user may say that he or she was using a particular feature or function of the piece of software 104 that caused it to crash. The user may also note that the crash is a recurring event when using a particular feature or function.

When the bug report 110 is complete, it may be sent to a server 114. The server 114 may be associated with a bug reporting entity. The bug reporting entity may be a developer. In some examples, the bug reporting entity may be an organization that wishes to facilitate software bug reporting.

In some examples, the bug reporting entity may require that a user open an account with the entity. Thus, the user will be given a username and password to access his or her account. The client module 108 may be automatically linked with the user's account. In some examples, if a user does not have an account with the bug reporting entity, then the client module 108 will automatically create one for the user. Thus, the user does not have to perform this step. Additionally, the client module 108 may manage the user's username and password for access to the resources provided by the bug reporting entity.

The server 114 may be any type of computing system that is capable of hosting or receiving bug reports 110. Bug reports 110 from multiple users on multiple client systems 102 may be received and presented as posts within a feed 116. Thus, the bug reporting feed 116 may include several posts. Each post corresponds to a bug report 110. The post may present some information about the bug 106 as well as the user's description of the bug 106. Other users or developers may respond to those posts with suggestions and help.

The following describes, in further detail, the features of the client module 108 and the bug feed 116.

Figure 2:
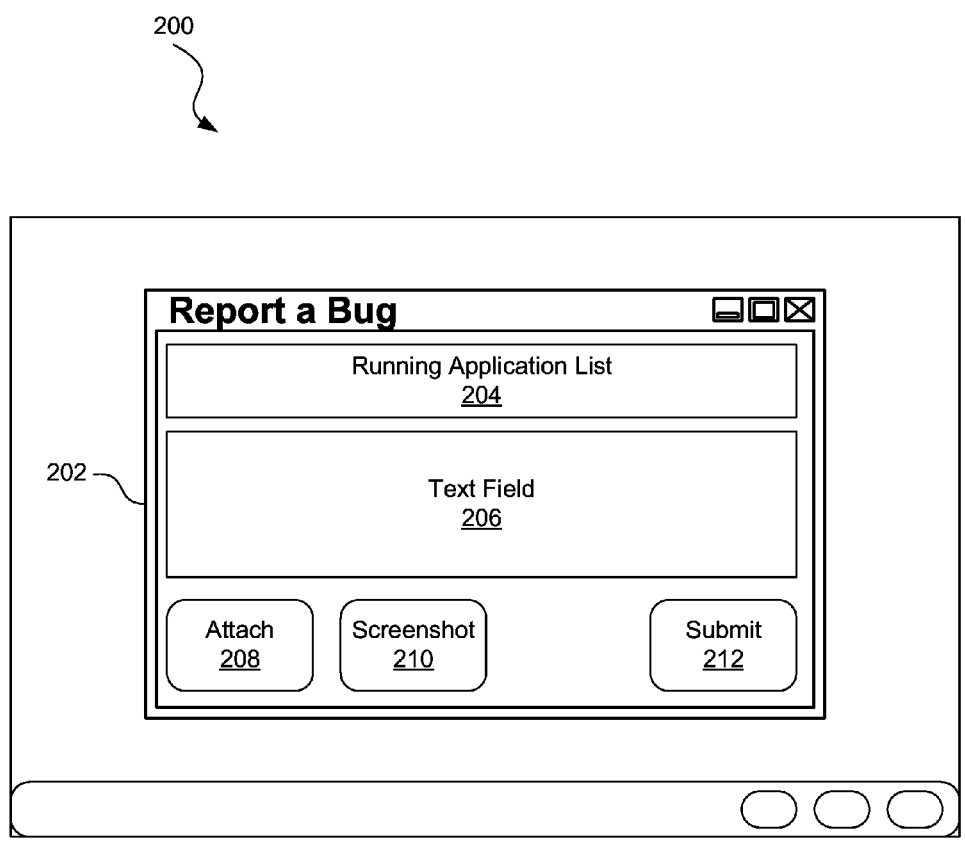
FIG. 2 is a diagram showing an illustrative bug reporting prompt of a client module for bug reporting and communication, according to one example of principles described herein.

FIG. 2 is a diagram showing an illustrative bug reporting prompt 202 of a client module for bug reporting and communication. According to the present examples, the client module may provide a prompt 202 to a user through the graphical user interface 200 of the user's computing system. The prompt may include a variety of components, including a running application list 204, a text field 206, an attach button 208, a screenshot button 210, and a submit button 212. The features illustrated in the prompt 202 are merely examples. Other features, or the same features presented in a different manner, may be provided in accordance with principles described herein.

The running application list 204 provides the user with a list of applications that are currently running on the user's system (e.g. 102, FIG. 1). The user may then be prompted to select the application with which the user is having issues. While in some cases, the client module (e.g. 108, FIG. 1) may be able to determine which application caused the crash, in some cases, it may not. Thus, in some cases, the user may manually initiate the prompt 202. The user can then select the application associated with the bug report (e.g. 110, FIG. 1).

In some cases, the application for which the user wishes to submit a bug report may not be presently running. For example, if the application recently crashed and forced the operating system to close it down, then that application may not be running when the user opens the prompt 202. The user may have the option to see a list of recently run applications. In some examples, the user may be provided with a list of all applications installed on the user's system. The user may also be provided with a mechanism to search those applications to find the application for which the user intends to report a bug.

The prompt 202 may also include a text field 206. The text field 206 allows the user to provide additional detail about the bug (e.g. 106, FIG. 1). Specifically, the user may type up an explanation of the bug, what he or she was doing when the bug was noticed, and other information that the user believes may be helpful for the developer. In some examples, the prompt 202 may include a list of specific questions (not shown) for the user to answer. For example, a question may ask the user what feature or function he or she was using before the bug was noticed. A question may also ask if the user is able to reproduce the bug and if so, how the user can reproduce the bug. A question may also ask if it is a recurring bug and if so, in what circumstances does it tend to occur.

The prompt 202 may also include an attach button 208 to allow a user to attach a file to the bug report. The file may be an image file that includes a picture taken of the bug. The attachment may also be a file that is associated with the piece of software that has a bug. For example, a particular file, when used by the piece of software, may be what causes the bug. Such a file may be useful for the developer.

The prompt 202 may also include a screenshot button 210. This button 210 will take a screenshot of the user's screen. This may be useful if the bug is visually apparent. For example, if the bug involves displaying something incorrectly, the screenshot button 210 may be used to take a picture of the incorrect display.

The prompt 202 also includes a submit button 212. When the user completes the description of the bug in the text filed 206, and has attached any files or screenshots, the user can submit the bug report by clicking the submit button 212. Upon being submitted, the bug report is sent to the bug reporting entity to be posted on a bug reporting feed.

Figure 3:
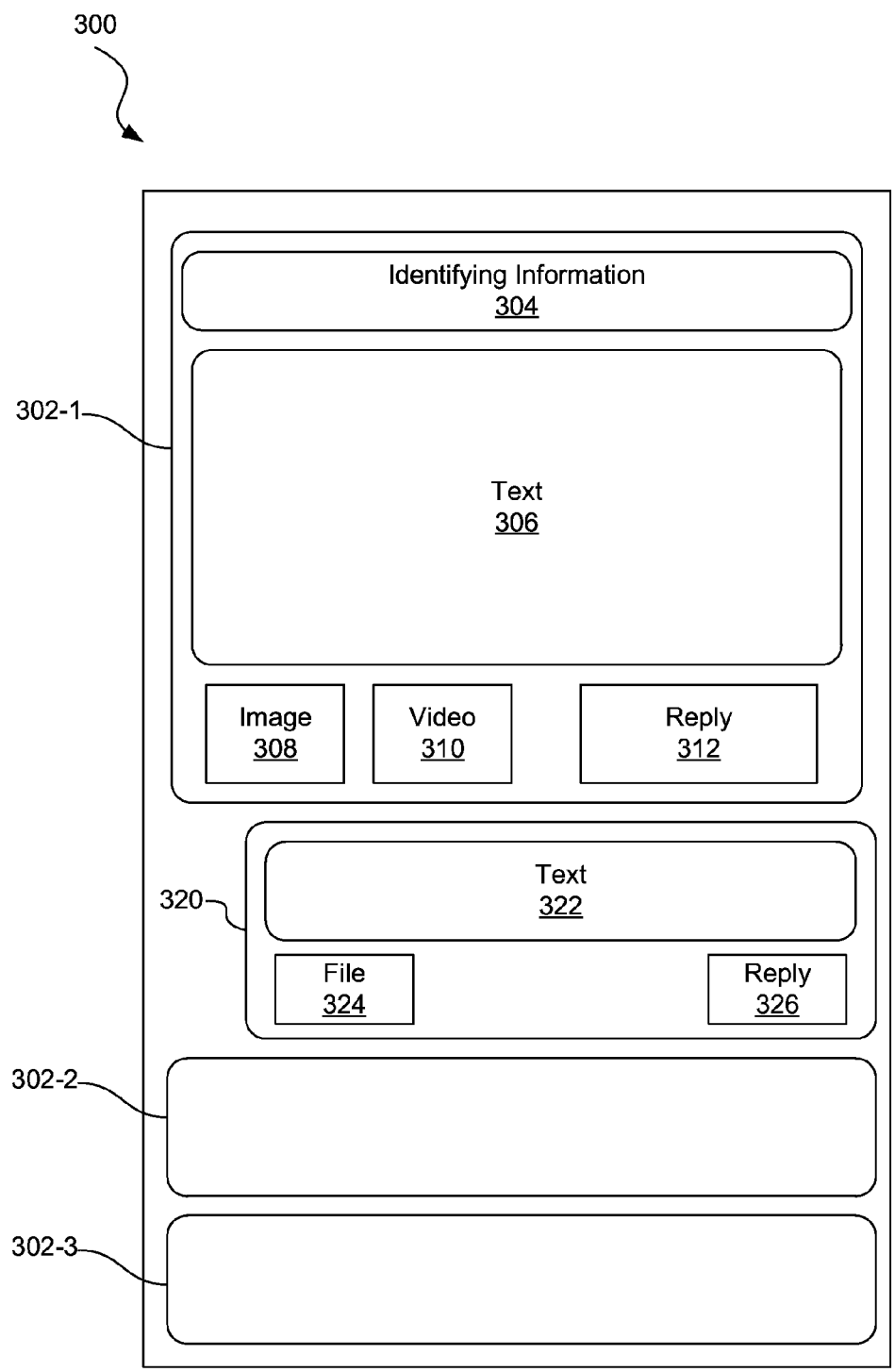
FIG. 3 is a diagram showing an illustrative bug reporting feed, including a number of bug reporting posts, according to one example of principles described herein.

FIG. 3 is a diagram showing an illustrative bug reporting feed 300, including a number of bug reporting posts 302. According to the present example, a bug reporting post 302 may include identifying information 304, text, 306, an image link 308, a video link 310, and a reply button 312. Responses 320 to a post 302 may include text 322, a file link 324, and a reply button 326.

The bug reporting feed 300 may be provided by one or more servers (e.g. 114, FIG. 1) associated with a bug reporting entity. For example, the bug reporting entity may own and operate the servers. Alternatively, the bug reporting entity may be in a business arrangement with the owner or operator of the servers.

The bug reporting feed 300 may present a set of bug posts 302, each post 302 corresponding to a bug report (e.g. 110, FIG. 1) filed by various users. The bug reporting feed 300 may be available to various groups of users. In one example, the bug reporting feed 300 may be publicly available to anyone. In some examples, the bug reporting feed 300 may be available to those who create an account with the bug reporting entity. In some examples, the bug reporting feed 300 may be publicly available, but only persons having an account with the bug reporting entity may reply to posts 302.

The bug reporting feed 300 may be presented to different users in a different manner. For example, a user may wish to see posts 302 associated with a particular piece of software. Alternatively, a user may wish to see only posts 302 produced by the user or those who the user has chosen to associate with through the bug reporting entity. For example, the user may have a list of other users who have an account with the bug reporting entity with which the user is acquainted. The user may have the bug reporting feed 300 show only the posts 302 made by the list of approved acquaintances. In addition to those posts, the feed 300 may show replies to those posts 302 regardless of whether the user is acquainted with the persons submitting the replies.

The posts 302 within a feed may be presented with the newest posts 302 on top of the feed 300 and older posts 302 at the bottom. Specifically, when a new post 302 comes in, it is displayed at the top of the feed 300. The second most recent post 302 is then pushed down on the feed 300. In the present example, post 302-1 is newer than post 302-2. Likewise, post 302-2 is newer than post 302-3. In some examples, the posts 302 may be added to the feed 300 in real time. Thus, if a user so desires, he or she may watch as new posts 302 are added to the feed 300.

The posts 302 may include identifying information 304. The identifying information 304 may be displayed at the top of the post 302. In some examples, the identifying information 304 may be in the form of a header. The identifying information 304 may include the date and time of the post 302. The identifying information 304 may also include the software with which the bug is associated. Thus, a reader of the post 302 can readily identify what piece of software the bug report concerns. The identifying information 304 may also include other information such as a category or tag assigned to the bug report. The identifying information 304 may also include the identity of the user who provided the bug report. The identity may be in the form of the username of the user's account. Alternatively, the identity may be a name provided by the user for display.

The text 306 portion of the post 302 provides the text provided by the user in the prompt (e.g. 202, FIG. 2). This allows the reader to read what the user who created the bug report associated with the post 302 wrote about the bug. The text 306 region may also include automatically generated information about the bug.

The image link 308 provides the reader with a link to an image attached to the post 302. As described above, a user may attach a file to the bug report. This file may be an image taken with a camera that is external to the user's computing system. Alternatively, the image may be a screenshot taken of the user's screen as the bug occurred. The image file may be stored somewhere on the server that provides the feed 300. In some examples, the image file may be stored on a different server that is in communication with the server that provides the feed 300.

The video link 308 provides the reader with a link to a video file that is attached to the post 302. As described above, a user may attach a file to the bug report. This file may be a video file that is taken with a camera that is external to the user's computing system. Alternatively, the video may be a recording, taken by the user's computing system, of the graphical user interface as the bug is occurring. The video file may be stored somewhere on the server that provides the feed 300. In some examples, the video file may be stored on a different server that is in communication with the server that provides the feed 300.

In some examples, instead of an image link, the image may be displayed in-line with the post. Likewise, a video may be presented in-line with the post instead of a video link. Thus, the user does not have to click on a link to view the content.

The reply button 312 allows a reader of the post to reply to the post 302. In some examples, any reader who is able to read the post 302 may reply to the post 302. Thus, if the feed is publicly available, then any reader, regardless of whether they have an account with the bug reporting entity, may reply. In some examples, if the feed 300 is limited to those with accounts, then only those with accounts may be able to reply. In some examples, the user who provided the bug report associated with the post may respond to his or her post. This may be useful if the user thinks of additional information to add to the description of the bug. In some cases, the bug may occur again but in a slightly different way and the user may wish to add this information to the description.

Using the reply button 312 allows a reader to respond to the post, thus creating a response 320. In the illustrated example, the response is indented to distinguish it as a response and not a regular post. Thus, a reader of the feed 300 can quickly distinguish between posts 302 and responses 320 to those posts 302. In the illustrated example, the response 320 includes a text filed 322, a file link 324 and a reply button 326.

The text field 322 includes the main body of text of the responder's response. The file link 324 provides a link to a file which the responder may attach to the response 320. The file may be stored on either the same server providing the feed 300, or a different server in communication with the server providing the feed 300. The reply button 326 allows a reader of the response 320 to post a reply to that response 320. Readers may continue to reply to the responses to form a thread.

Figure 4:
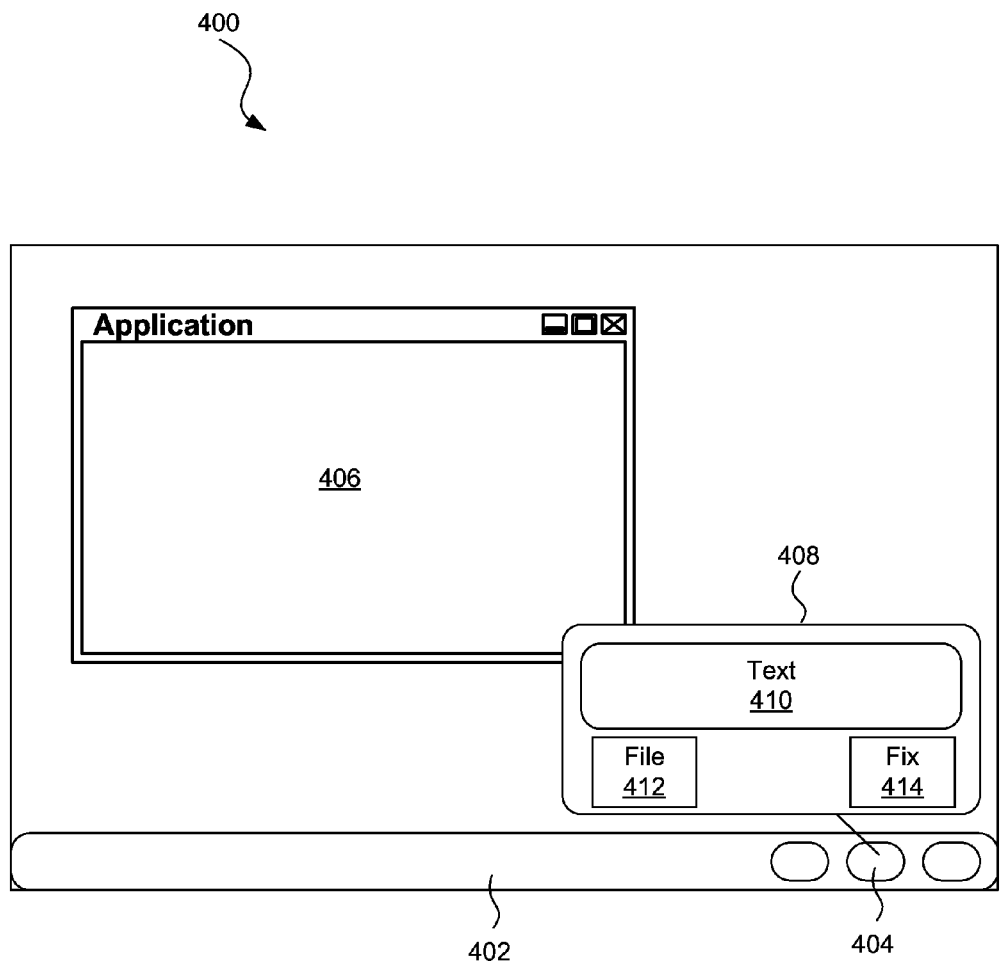
FIG. 4 is a diagram showing an illustrative desktop push from the bug reporting client module, according to one example of principles described herein.

FIG. 4 is a diagram showing an illustrative desktop push 408 from the bug reporting client module (e.g. 108, FIG. 1). According to certain illustrative examples, a user may be notified when someone responds to a post made by that user. The user may be notified through a graphical user interface 400. In some examples, the user may be notified through an email address provided to the bug reporting entity when the user established an account. In one example, the user may be notified through a desktop push 408 through the client module.

In the graphical user interface 400 illustrated in FIG. 4, a user is provided with a tray 402 of icons. The icons may represent different applications. In this example, one icon 404 represents the bug reporting client module. Thus, if the user wishes to interact with the client module, he or she may click on that icon. Additionally, a desktop push 408 may be associated with that icon 404.

The desktop push 408 may be received in real time when a reader responds to the user's post associated with the bug report (e.g. 110, FIG. 1). The response may be from the developer who may be proposing a solution or fix to the bug. The desktop push 408 may include text 410, a file link 412, or a fix 414.

The text 410 displays the text provided by the responder in the response to the user's bug report post. The text may also include other information such as the identity of the person responding to the bug report post. The text 410 may also include information about the bug for which the post relates. This may be useful if the user regularly reports bugs for different pieces of software because the user can be reminded of which piece of software to which the response pertains.

The file link 412 may provide the user with a link to a file that was attached to the response by the responder. The file may be a document describing a solution to the bug. In some examples, the file may be an executable file from the developer that either patches the bug or installs a new version of the software in which the bug has been resolved. The developer may also ask the user, in the text field 410, whether the bug has been fixed as a result of the patch or update.

In one example, the file associated with the file link 412 is attached with the desktop push. Thus, the file is received locally along with the information for the desktop push. In some examples, the file associated with the file link 412 is stored on some server. Thus, the file link 412 includes a uniform resource locator (URL) that points to the file location. The user can then download the file when clicking on the file link 412.

In some examples, the client module may make installation of the fix easier for the user. For example, the push 408 may include a fix button 414. The developer may provide an update with the response that can be executed or installed automatically when the user clicks the fix button 414. Thus, the user does not have to download the file, open the file location, and manually run the executable file. Rather, the user can just click the fix button 414 when the desktop push appears 408.

Figure 5:
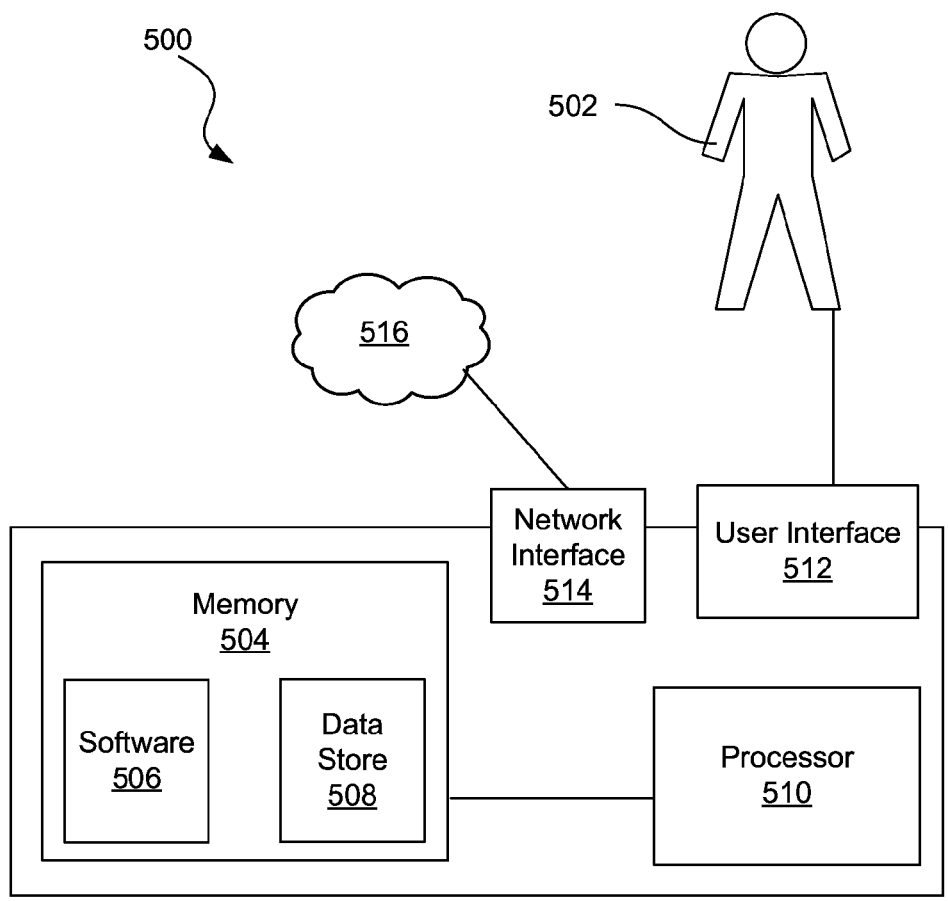
FIG. 5 is a diagram showing an illustrative computing system that can be used for bug reporting and communication, according to one example of principles described herein.

FIG. 5 is a diagram showing an illustrative processing system 500 that can be used for bug reporting and communication. According to certain illustrative examples, the processing system 500 includes a memory 504 which may include software 506 and a data store 508. The processing system 500 also includes a processor 510, a network interface 514, and a user interface 512.

The memory 504 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The processing system 500 also includes a processor 510 for executing the software 506 and using or updating the data 508 stored in memory 504. The software 506 may include an operating system and any other software applications a user may wish to install. The software 506 may include the client module described above. Specifically, the software 506 may include the appropriate machine readable instructions to provide the bug reporting and communications mechanisms described above.

The user interface 512 may include a number of input devices such as a mouse, touchpad, or touchscreen that allow the user 502 to interact with a GUI. The user interface 512 may also include a number of different types of output devices such as a monitor or a touchscreen. The user interface allows the user 502 to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 516 may also be designed to communicate with the network 516 using wireless technologies.

Figure 6:
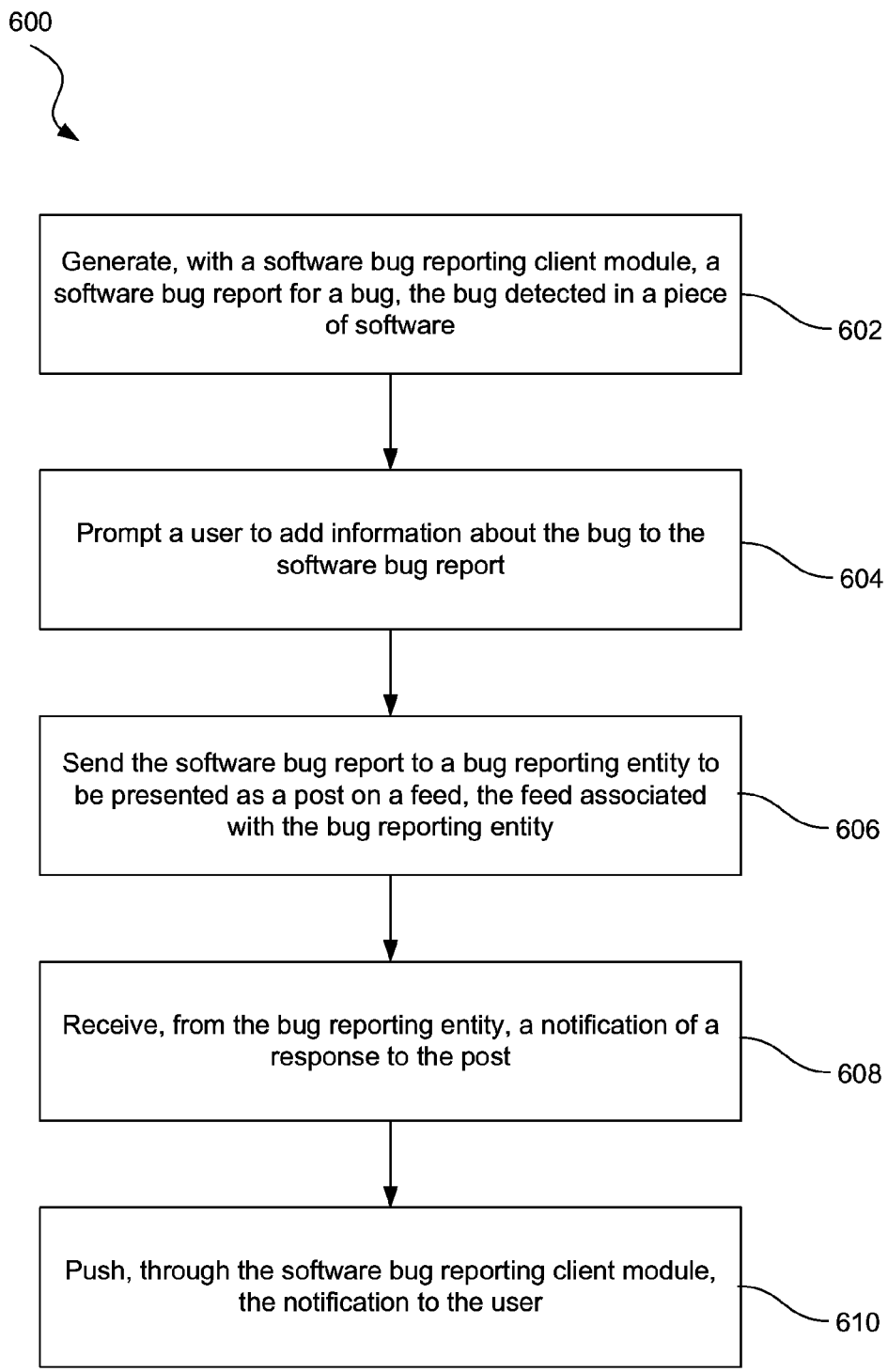
FIG. 6 is a flowchart showing an illustrative method for bug reporting and communication, according to one example of principles described herein.

FIG. 6 is a flowchart showing an illustrative method for bug reporting and communication. According to illustrative examples, the method 600 includes generating 602, with a software bug reporting client module, a software bug report for a bug, the bug being detected in a piece of software. The report may be generated automatically in response to detection of a bug. For example, the computing system running a piece of software may detect that the piece of software has locked up or crashed. In some examples, however, a user may manually initiate the generation of the bug report.

The method 600 further includes prompting 604 a user to add information about the bug to the software bug report. Thus, the user may provide a description of what he or she was doing that caused the piece of software to crash. The user may also provide a description about what the bug is causing the piece of software to do.

The method 600 further includes sending 606 the software bug report to a bug reporting entity to be presented as a post on a feed, the feed associated with the bug reporting entity. The bug reporting entity may be the entity that produced the piece of software. Alternatively, the bug reporting entity may be an organization that desires to facilitate the reporting of software bugs.

The method 600 further includes receiving 608, from the bug reporting entity, a notification of a response to the post. Thus, when a reader responds to a post associated with the bug report, that response is transmitted back to the system of the user who sent the bug report. The client module of the user's system can receive and process the response accordingly.

The method 600 further includes pushing 610, through the software bug reporting client module, the notification to the user. The notification may be pushed in a variety of ways. In one example, the notification is sent to the user's email address. In one example, a notification appears on the desktop of the GUI of the user's system. This may be done in real time. Thus, by using principles described herein, users may communicate with developers and other users to efficiently resolve software bugs.

In some cases, the user may reply to the response to the post and a conversation may ensue. Particularly, the user may receive additional notifications when others respond to the user's responses. Thus, steps 608 and 610 may be continually repeated.

Some examples of processing systems described herein may include non-transient, tangible, machine readable media that include executable code that when run by one or more processors (e.g., processor 510) may cause the one or more processors to perform the processes of method 600 as described above. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for software bug resolution, the method performed by a processing system, the method comprising:
    generating, with a software bug reporting client module on a first device associated with a user of a piece of software, a software bug report for a bug in the piece of software running on a second computing device;
    prompting the user to add information to the software bug report;
    sending the software bug report to a bug reporting entity;
    receiving, from the bug reporting entity, a notification of a response to a post within a feed, the post corresponding to the software bug report, the feed comprising multiple posts from other users of the piece of software on one or more other computing devices, wherein the other users have at least one account with the bug reporting entity, wherein the feed is available to the other users, and wherein the multiple posts correspond to other software bug reports;
    approving, by the user, one or more of the other users;
    presenting, to the user, a subset of the multiple posts and one or more responses to the subset of the multiple posts, the subset of the multiple posts corresponding to the one or more approved users; and
    presenting, through the software bug reporting client module, the notification to the user.

2. The method of claim 1, wherein the post is associated with an account of the user, the account being with the bug reporting entity.

3. The method of claim 1, further comprising, automatically creating an account with the bug reporting entity for the user if the user does not have an account with the bug reporting entity.

4. The method of claim 1, wherein the response includes a recommendation for a fix for the bug.

5. The method of claim 1, wherein the response includes computer readable instructions comprising a fix for the bug.

6. The method of claim 5, wherein the computer readable instructions comprising the fix are implemented through the client module.

7. The method of claim 1, wherein generating the software bug report is automatically done in response to a crash of the piece of software.

8. The method of claim 1, wherein generating the software bug report is manually initiated by the user.

9. The method of claim 1, further comprising, sending a reply to the post on the feed.

10. The method of claim 1, wherein the feed presents posts with newer posts on top and older posts on bottom.

11. The method of claim 1, wherein the response to the post in the feed is presented in association with the post.

12. The method of claim 1, wherein the information added to the bug report includes at least one of: texts, images, and video.

13. The method of claim 1, wherein the client module has a mobile application component that runs on a mobile device of the user and operates in connection with the client module of a system running the client module.

14. The method of claim 1, further comprising, receiving notifications of posts from the other users, the other users being selected by the user to receive the notifications of posts.

15. A server system comprising:
a processor; and
a memory comprising computer readable instructions that when executed by the processor, cause the processor to:
receive a bug report from a client module running on a client system associated with a user of a piece of software, the client system being in communication with the server over a network, the bug report including user added information about a bug in the piece of software running on a second computing system;
publish the bug report as a post in a feed, the feed being available to other users of the piece of software on one or more other computing systems, the other users having submitted bug reports related to the bug to a bug reporting entity, the bug reporting entity being associated with the server, wherein the other users have at least one account with the bug reporting entity;
receive a response to the post;
send a notification of the response to the client module;
send the response to the client module, the response to be pushed to a user of the client system;
approve, by the user, one or more of the other users that have submitted bug reports; and
present, to the user, a subset of the submitted bug reports and one or more responses to the subset of the submitted bug reports, the subset of the submitted bug reports corresponding to the one or more approved users.

16. The server system of claim 15, wherein the response is from a developer of the piece of software and includes at least one of: text that instructs the user how to fix the bug and a set of computer readable instructions that when executed by a processor of the client system, implement a solution to the bug.

17. The server system of claim 15, connecting an account of the user to other user accounts of other user's that are in a mutual agreement to be connected through the bug reporting entity.

18. A non-transitory, machine-readable medium comprising a set of machine readable instructions that when executed by a processor, cause the processor to:
generate, with a software bug reporting client module on a first computing device associated with a user of a piece of software, a software bug report of a bug in the piece of software;
prompt the user to add information about the bug to the software bug report;
send the software bug report to a bug reporting entity;
receive, from the bug reporting entity, a notification of a response to a post within a feed, the post corresponding to the software bug report, the feed corresponding to the bug reporting entity, the response being from a developer of the piece of software, the feed comprising multiple posts from other users of the piece of software, the feed being available to the other users, wherein the other users have at least one account with the bug reporting entity;
approve, by the user, one or more of the other users that have submitted bug reports;
present, to the user, a subset of the multiple posts and one or more responses to the subset of the multiple posts, the subset of the multiple posts corresponding to the one or more approved users; and
present, through the software bug reporting client module, the notification to the user.

19. The machine-readable medium of claim 18, wherein the software bug report includes information about a state of a client system running the machine readable instructions.

20. The machine-readable medium of claim 18, wherein the post includes identifying data about the bug.

* * * * *